Sept. 8, 1970 MICHIYUKI UENOHARA 3,528,035

TWO VALLEY SEMICONDUCTIVE DEVICES

Filed July 11, 1966

INVENTOR
M. UENOHARA
BY
Arthur J. Torsiglieri
ATTORNEY 3,528,035

TWO-VALLEY SEMICONDUCTIVE DEVICES

Michiyuki Uenohara, Scotch Plains, N.J., assignor to Bell Telephone Laboratories, Incorporated, Murray Hill, N.J., a corporation of New York Filed July 11, 1966, Ser. No. 564,356
Int. Cl. H03c *3/22;* H03b *5/24*
U.S. Cl. 332—16 3 Claims

ABSTRACT OF THE DISCLOSURE

Modifications are disclosed, in two-valley semiconductor oscillators made of materials such as n-type gallium arsenide, that alter the characteristic oscillatory frequency of each device by changing the electric field within the device. This is accomplished, for example, by altering the effective width of the current channel in the device. Alternatively, certain modifications are also used to initiate oscillations in the presence of a steady state bias that otherwise would be insufficient for such initiation.

Figure 1:
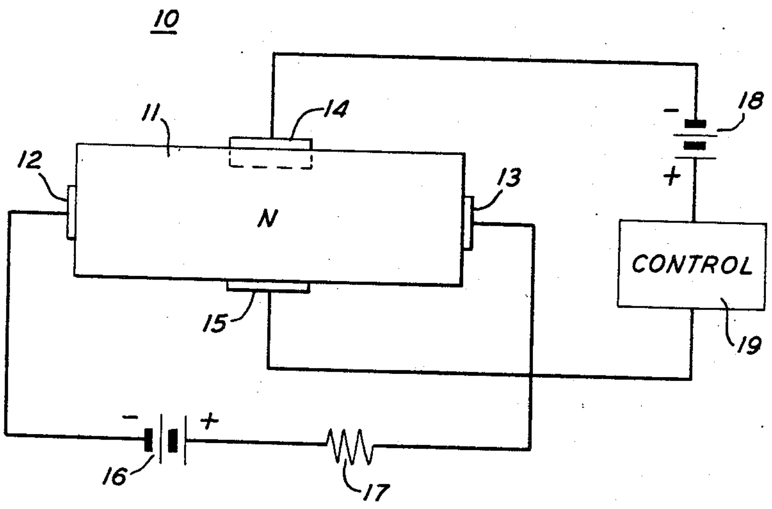

This invention relates to pulse generators and more particularly to such generators which employ as the active device a wafer of a two-valley compound semiconductor in which the transfer of high energy electrons between a pair of conduction-band valleys with different mobilities and separated in energy produces electrical instabilities.

The basic theory of "two-valley "semiconductor devices, as such devices will be designated herein for the sake of brevity, is set forth in detail in a number of papers in the special issue on semiconductor bulk-effect and transit time devices of the I.E.E.E. Transactions on Electron Devices, January 1966.

In particular, it is known that if the voltage applied to a suitable wafer or element of an appropriate semiconductor, such as n-type gallium arsenide, is increased, the average sample current increases almost linearly to a maximum value and then drops suddenly to between 60 and 90 percent of the maximum value and maintains this reduced value almost constant with further increases in voltage. Moreover, in this range of reduced value, the instantaneous current wave form is found to oscillate periodically at a frequency related to the sample length.

It is now understood that the oscillatory state is associated with the creation and travel of a high electric field domain through the wafer from the negative electrode, or cathode, to the positive electrode, or anode. Even if the applied voltage is dropped below the threshold voltage, the high field domain does not disappear but continues to drift towards the anode so long as the applied voltage is kept above a minimum sustaining value. More particularly, it appears that the normal repetition rate or oscillatory frequency is determined by the transit time of this traveling field domain between the cathode and anode.

The present invention relates to arrangements for modifying controllably the repetition rate from this characteristic rate whereby there may be achieved modulation in accordance with signal intelligence. In particular, in accordance with the invention modification of the repetition rate is achieved by modifying the electric field distribution in the semiconductive element under control of a voltage applied by an auxiliary electrode which makes a rectifying connection with the element.

In a preferred embodiment of the invention in which the repetition rate is varied between a pair of stable values, a pair of control electrodes are provided along opposite surfaces of the semiconductive element approximately midway between the cathode and anode. One of the two control electrodes makes a rectifying connection and the other an ohmic connection. Between the cathode and anode are connected a voltage source sufficient for the generation of a traveling domain therebetween and a load. By the application of voltages in accordance with signal information to the control electrodes, there is modified accordingly the electric field in the region of the element between the control electrodes from a value which is lower than that near the cathode to a value exceeding that near the cathode whereby the domain is initiated in the higher field region rather than at the cathode. As a consequence, there will be generated in the load current pulses whose repetition rate corresponds to the characteristic fundamental rate when the traveling domain travels the complete distance between cathode and anode and to a higher value when the traveling domain travels a lesser distance because of its initiation at the high field region defined by the control electrodes.

In an alternative embodiment better adapted for modulation over a band of frequencies or for use as a memory cell, the element in addition to its cathode and anode connections is provided with a single control electrode which advantageously makes a rectifying connection close to the cathode connection. Variation of the voltage applied to such control electrode to modify the electric field in the cathode region can be used to vary the repetition rate of current pulses in the load connected between the cathode and anode. Alternatively, the control electrode can be used to provide a nucleating pulse which sets up the traveling domain in the presence of steady state bias conditions which otherwise would be insufficient for the initiation of such domains.

Figure 2:
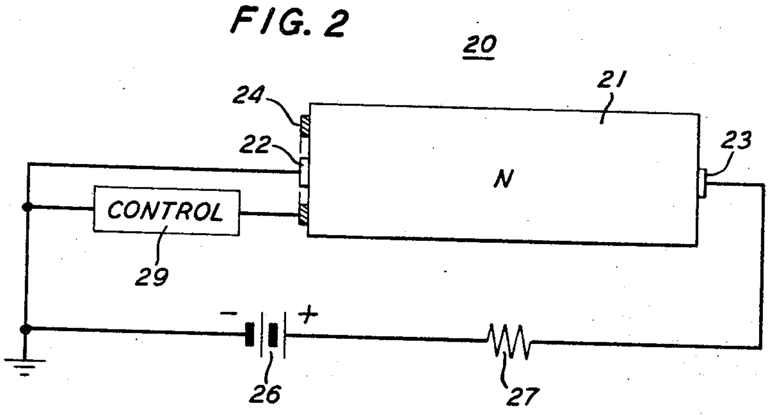

The invention will be better understood from the following more detailed description taken in conjunction with the accompanying drawing in which:

FIG. 1 shows schematically a pulse generator in accordance with one embodiment of the invention adapted to operate at one of two pulse repetition rates; and FIG. 2 shows schematically a pulse generator in accordance with another embodiment of the invention in which the pulse repetition rate can be varied either over a range of values or on an off-on basis.

With reference now more particularly to the drawing, the pulse generator 10 shown in FIG. 1 comprises a two-valley semiconductive device including a semiconductive element or wafer 11 of a suitable material, such as n-type gallium arsenide, to which are connected at opposite ends the cathode 12 and anode 13 and midway between the ends on opposite surfaces the control electrodes 14 and 15. Electrode 14 is chosen to make a rectifying connection to the bulk of the element and this is advantageously achieved by making it of a metal, such as gold, which provides a surface barrier type of rectifying connection. Alternatively, electrode 14 may be provided with an acceptor to form a p-n junction type of rectifying connection in the manner known to workers in the art. Between cathode 12 and anode 13 are connected the D-C voltage source 16 and the load 17. shown schematically as a resistor. The source 16 applies a voltage sufficient to insure the continuing initiation of traveling domains at the cathode for travel to the anode, in the manner characteristic of the usual operation of two-valley or Gunn-effect type oscillators. Between the control electrodes 14 and 15 are connected a voltage source 18 and a control element 19 which in its simplest form would be a switch having an open and a closed position. Voltage source 18 is chosen so that when control element 19 is in a closed position, there is associated with electrode 14 a depletion layer which markedly reduces the effective width of the current channel in the element in the region between electrodes 14 and 15. To this end, source 18 is poled to bias the rectifying connection in reverse. Essentially the role of electrode 14 is like the role of the control element in a field effect transistor, where it serves to control the current path between the source and the drain.

As a consequence, when the control 19 is in a closed position, the traveling domain is initiated at the highest field plane adjacent the control electrodes and so its transit time to the anode is substantially halved. However, after extinction a new domain is initiated promptly at the same plane for travel to the anode. There is initiated in the output circuit including load 17 a current pulse each time the traveling domain is extinguished and a new one initiated. As a consequence, there flows through the load a train of current pulses whose repetition rate is essentially twice what it is when control 19 is open, corresponding to the situation where the domain launched at the cathode travels the complete distance to the anode before extinction.

If desired load 17 may comprise a succession of two tuned circuits, one tuned at the fundamental whereby it is energized when control 19 is open, the other at twice the fundamental to be energized when control 19 is closed.

It should also be obvious that the ratio between the fundamental repetition rate and the modified repetition rate can be varied by varying the location of the control electrodes between the cathode and anode.

Similarly, by locating additional control electrodes and inclusion of appropriate control circuitry, the repetition rate may be varied between a corresponding number of repetition rates.

FIG. 2 shows an arrangement 20 better adapted for use for varying the repetition rate over a range of values rather than a limited number. The two-valley semiconductive device comprises an appropriate semiconductive element 21, which as before typically would be n-type gallium arsenide and which is provided at opposite ends with cathode 22 and anode 23. A control electrode 24 making a rectifying connection to the element 11 is provided near the cathode, advantageously concentric with the cathode if size permits. A voltage source 26 and load 27 are connected between the cathode and anode. A control branch 29 is connected between the cathode and the control electrode 24.

When the arrangement is to be used for frequency modulation, the voltage source 26 is arranged to provide a voltage sufficient for the steady generation of traveling domains between the cathode and anode. Control branch 29 is used to apply voltages in accordance with modulating information to the control electrode 24 whereby the electric field conditions at the cathode are modified sufficiently to affect the phase of the initiation of traveling domains at the cathode. In particular, if the electric field near the cathode is increased by virtue of the action of control electrode 24, the pulse repetition rate measured in load 27 decreases, while a decrease in such field may be made to increase the repetition rate.

Alternatively, the arrangement may be used as a memory cell in accordance with the principles described in my copending application Ser. No. 542,168, filed Apr. 12, 1966, and having a common assignee as this application. For such applications, the voltage source 26 and the load 27 are adjusted such that in the absence of any voltage on electrode 24, the conditions in element 21 are unsuitable for the initiation of traveling wave domains but that in the event that a traveling domain is once initiated conditions in element 21 are suitable for sustaining the initiation of new traveling domains at the cathode after the domain has reached the anode and is extinguished. As is pointed out in my earlier application, operation in this fashion is possible by using a bias slightly below the threshold value for the initiation of oscillations and using transients resulting from a mismatch of the load at the extinction of a traveling domain to compensate for the inadequancy of this bias. In this mode of operation, a pulse applied by way of control electrode 24 initiates oscillations and these oscillations persist even after the voltage on control electrode 24 is removed whereby the device exhibits memory. Various techniques are described in my earlier application for sensing the state of the memory cell. Erasure or resetting of the memory cell to its normal quiescent state can be achieved either by reducing the voltage between cathode and anode to a value below that which will sustain oscillations or alternatively by the application to electrode 24 of a pulse of sufficient amplitude and opposite polarity to that used for initiating oscillations.

In the various embodiments described, the control electrode has been chosen to make a rectifying connection to the wafer. A connection of this kind is particularly efficacious when the rectifying connection is operated in reverse which is a high impedance state and requires little signal power. When the connection is to be operated in a forward direction or the low impedance state, that advantage tends to disappear and accordingly an ohmic connection may serve just as well.

It should be understood that the particular embodiments described are merely illustrative of the general principles of the invention. Various modifications will be apparent to a worker skilled in the art consistent with the spirit and true scope of the invention. In particular, integrated circuits techniques may be used in which the semiconductive element useful in the manner described is part of a larger semiconductive crystal which includes portions serving additional roles.

Other arrangements involving use of an auxiliary electrode are described in copending application Ser. No. 564,071 of T. Hayashi filed contemporaneously and having a common assignee.

What is claimed is:

1. Electrical apparatus comprising a two-valley semiconductive device comprising a semiconductive element having cathode and anode connections, a voltage source connected between said cathode and anode for applying a voltage sufficient for the initiation at the cathode of domains for travel to the anode, means for varying the repetition rate of traveling domains in the two-valley semiconductive device comprising control electrode means making connection to the element along the path of current flow between the cathode and anode, said control electrode means including a first electrode making a rectifying connection to the element and a second electrode making an ohmic connection to said element on opposite sides of the element, and voltage control means for applying under the control of signal information a voltage to said control electrode means, the polarity of said voltage being such as to reverse bias the rectifying connection, said voltage being appropriate for decreasing near the control electrode means the effective width of the path of current flow between the cathode and anode enough that the electric field is there sufficient for the initiation of a domain, whereby the repetition rate of the traveling domains may be varied from the fundamental value.

2. Electrical apparatus comprising a two-valley semiconductive device comprising a semiconductive element having cathode and anode connections at opposite ends and a control connection adjacent the cathode, a voltage source for applying between said cathode and anode a voltage insufficient alone for the initiation at the cathode of domains for travel to the anode but sufficient for sustaining the generation of domains once established, and control means for applying to the control electrode under the control of signal information a pulse adequate for the initiation of domains whereby such domains continue to be generated even after termination of the pulse so that the device can serve as a memory cell.

3. The electrical apparatus of claim 2 wherein the voltage applied by the voltage source is at least 95 percent of the voltage sufficient for the initiation of domains at the cathode.

References Cited

UNITED STATES PATENTS

| | | |
|---|---|---|
| 3,365,583 | 1/1968 | Gunn. |
| 3,435,307 | 3/1969 | Landauer. |

OTHER REFERENCES

I.B.M. Technical Disclosure Bulletin, vol 8, No. 9, February 1966, p. 1302, T. N. Morgan, Electrical Shock Wave Device.

Wireless World, pp. 260–264, "Field-Effect Devices," June 1965, Olsen, vol. 71, No. 6.

Steele: "Magnetic Tuning of Gunn Effect Oscillators," RCA Technical Notes, RCA TN No. 663 November 1965, 2 sheets.

ALFRED L. BRODY, Primary Examiner

U.S. Cl. X.R.

307—251, 279; 317—234; 331—107; 332—52